(12) United States Patent
Ghazarian

(10) Patent No.: US 8,849,239 B2
(45) Date of Patent: Sep. 30, 2014

(54) IMPACT SENSING MOBILE COMMUNICATION DEVICE

(76) Inventor: Ohanes Der Ghazarian, Henderson, NV (US)

(*) Notice: Subject to any disclaimer, the term of this patent is extended or adjusted under 35 U.S.C. 154(b) by 0 days.

(21) Appl. No.: 12/806,417

(22) Filed: Aug. 11, 2010

(65) Prior Publication Data

US 2011/0117877 A1   May 19, 2011

Related U.S. Application Data

(60) Provisional application No. 61/281,150, filed on Nov. 14, 2009.

(51) Int. Cl.
*H04M 11/04* (2006.01)
*H04M 1/725* (2006.01)

(52) U.S. Cl.
CPC ...... *H04M 1/72538* (2013.01); *H04M 2250/10* (2013.01); *H04M 2250/12* (2013.01)
USPC ..................... 455/404.2; 455/550.1

(58) Field of Classification Search
CPC .............. G01S 19/17; G01S 2205/006; G08B 21/0269; G08B 25/016; H04M 11/04; H04M 1/7253; H04M 1/72538; H04M 2250/10; H04M 2250/12; H04W 4/22; H04W 76/007; H04W 88/02
USPC ..................... 455/404.2, 402.1, 550.1–575.9, 455/456.1–456.3, 67.11, 521, 414.1–415
See application file for complete search history.

(56) References Cited

U.S. PATENT DOCUMENTS

| 7,308,272 | B1* | 12/2007 | Wortham | 455/456.1 |
| 2005/0153680 | A1* | 7/2005 | Yoshioka et al. | 455/404.1 |
| 2006/0201964 | A1* | 9/2006 | DiPerna et al. | 222/78 |
| 2007/0102527 | A1* | 5/2007 | Eubank et al. | 235/492 |
| 2008/0070546 | A1* | 3/2008 | Lee | 455/404.2 |
| 2008/0125078 | A1* | 5/2008 | Morimoto | 455/404.2 |
| 2009/0264093 | A1* | 10/2009 | Rothschild | 455/404.2 |

* cited by examiner

*Primary Examiner* — Chuong A Ngo

(57) ABSTRACT

Impact detection mobile communication device comprises;
a portable user carry on mobile wireless communication device containing an impact detection sensor used for detecting user bodily impact condition, and
a built-in GPS receiver used for receiving GPS location signals, and
a speaker and a microphone used in conjunction for user two way voice communication,
an RF transceiver used for establishing wireless communication with a monitoring station, and contains a processor.
The mobile communication device processor in response to received impact condition signal, sends a signal to the transceiver to transmit a signal containing information to the device ID, impact condition detection along with GPS location co-ordinances to a monitoring station through wireless communication network, and opens two way voice communication link between the communication device user and the monitoring station operator, the monitoring station operator based on received signals determines the impact condition velocity and dispatch's rescue personnel to impact detection device user location.

6 Claims, 2 Drawing Sheets

Block Diagram

IMPACT SENSING MOBILE COMMUNICATION DEVICE

This application benefits U.S. provisional application No. 61/281,150 filed on Nov. 2, 2009

BACKGROUND OF THE INVENTION

Presently motor vehicles are built with impact detection sensors which commonly used to deploy air bags during a vehicle accident, some of the present vehicles additionally are equipped with a GPS locator device having two way wireless voice communication system connected to vehicle's impact detection sensors, which upon receipt of impact detection signal the vehicle mount GPS unit transmits a signal through wireless network to a monitoring station containing GPS location information of the vehicle involved in collision and opens two way voice communication between the driver or occupant(s) of the vehicle and the monitoring station personnel, after confirmation the monitoring station personnel dispatch emergency assistance personnel for rescue, such well known system is called On Star.

Unfortunately the teaching found in prior art has it's limitation in use as it is useful only in a vehicle where the system is installed in, thus it's use is good only for the driver and occupants of a particular vehicle where the impact detection system and the GPS communication devices is installed in. As for all other vehicles which do not contain such a teaching the vehicle occupants cannot get the use and benefits of the art.

Contrary to the teachings found in the present invention, wherein the impact detection GPS based mobile communication device is portable and designed for the user to carry on where ever user travels, thus providing no limit of it's use regardless if the person carrying the impact detection communication device driving or traveling in a vehicle or is on a motorcycle, or a boat, or skiing, or is a passenger on public transportation system wherein such vehicles are not equipped with any sort of impact detection and reporting system. The present invention impact detection mobile communication device provides automatic emergency assistance service in all sort of bodily impact condition even in conditions where the person carrying the impact detection communication device is running, or fall there for the impact detection mobile communication system of the present inventions definitely is an improvement to prior art teachings.

It is accordingly the primary objective of the present invention to provide a user carry on impact detection mobile communication device containing an impact detection sensor and a GPS receiver, designed to detect user bodily impact condition in an event of an accident and wirelessly report the detected impact condition along with the device GPS co ordinance information to a monitoring station and the monitoring station operator based on the received information determines impact velocity and location information and dispatch rescue personnel to the impact detection user location to provide assistance.

It is accordingly another objective of the present invention which utilizes a portable impact sensing mobile communication device which provides automatic or monitoring station controlled two way voice communication between the device user and monitoring station operator and accordingly the monitoring station operator provides need assistance to the device user during a bodily impact condition.

It is another objective of the present invention that transmits user bodily impact condition with GPS velocity co ordinance to a monitoring station for monitoring station operator able to view the received impact condition velocity and accordingly determine if the received impact condition signal is of a high speed impact caused by a vehicle accident or contains no velocity at all caused by user falling and accordingly the operator determines the received impact signal cause.

It is further objective of the present invention that provides a impact detection mobile communication device that may contain a camera, the mobile communication device upon detection of an impact the device processor activates the mobile communication device camera and transmits captured video images to a monitoring station to provide audio visual information to a monitoring station operator, and the monitoring station operator may wirelessly control user mobile communication device camera function to get desired video images to able provide needed audio visual assistance.

SUMMARY OF THE INVENTION

Impact detection GPS based mobile communication device is designed to be used as user carry on communication device wherein when the person carrying the device gets into an bodily impact condition which arise from a vehicle accident regardless of person carrying the device is driving a vehicle or a passenger in any vehicle wherein the vehicle is not equipped with GPS based impact detection sensors to report an impact condition caused by an vehicle accident to a monitoring station. The present invention teaches a method wherein a person carrying the device has no limits of it's use and benefits, such as the person carrying the impact detection and communication device could be the driver or a passenger of a car, or user is on a motorcycle, on a boat, or skiing, or traveling in public transportation system etc. the present art teaching provides automatic emergency assistance service in all and any bodily impact condition where a person carrying the device may be involved.

It is accordingly the objective of the present invention to provide a portable impact sensing mobile communication device, such as a mobile phone device which contains;

a GPS receiver used for GPS location co ordinance of the mobile communication device, an impact sensor such as a G Force sensor used for detecting mobile communication device carry on user impact condition, and a processor to receive the detected impact signals and to receive the GPS location signals and based on received GPS co ordinance signals designed to transmit the received impact condition and received GPS location co ordinance information signals to a monitoring station through wireless communication network containing information to the wireless communication device ID, wireless communication device GPS co ordinance and open two way voice communication between wireless communication device user and a monitoring station operator, for monitoring station operator to dispatch emergency assistance personnel to the user location to provide assistance.

The present invention impact detection mobile communication device additionally may contain a camera, the mobile communication device of present invention upon detection of an impact, the device processor activates the mobile communication device camera and transmits captured video images to a monitoring station to provide audio visual information to a monitoring station operator, and the monitoring station operator may wirelessly control user mobile communication device camera function to get desired video images to able provide needed audio visual assistance.

DESCRIPTION OF THE DRAWINGS

These and other advantages of the present invention are best understood with reference to the drawings, in which.

DETAILED DESCRIPTION OF THE PREFERRED EMBODIMENT

Figure 1:
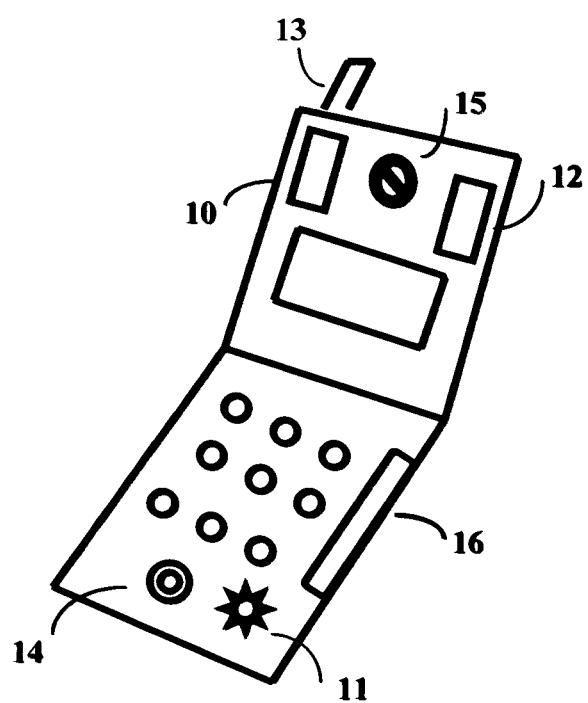
FIG. 1 Is a drawing of a mobile communication device having an impact sensor, a GPS receiver and an RF communication transceiver.
Figure 2:
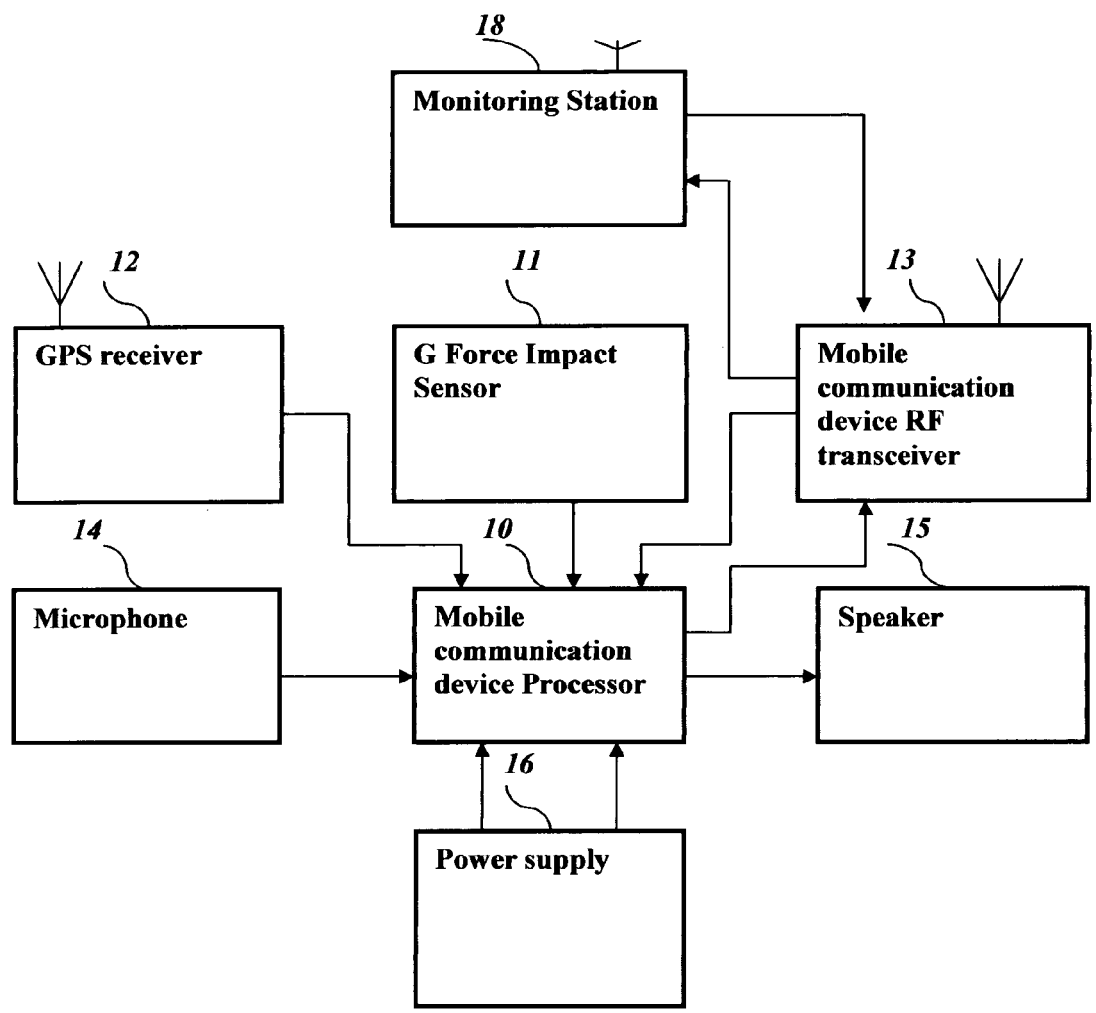
FIG. 2 Is a drawing of block diagram

Impact detection mobile communication device comprises;

a portable user carry on mobile wireless communication device having an impact detection sensor 11 used for detecting user bodily impact condition and send the detected impact signal to the mobile communication device processor 10, the communication device contains a GPS receiver 12 used for receiving GPS satellite signals and feed the received GPS co ordinance signals into the mobile communication device processor 10, and an speaker 15 and a microphone 14 is utilized within the communication device to able user to have two way voice communication with a monitoring station 18 or others, and an RF transceiver 13 is used for establishing wireless communication with a monitoring station 18. a battery 16 or other power means used to provide power for the impact detection mobile communication device.

The mobile communication device processor 10 in response to received impact condition signal from the impact sensor 11 sends a signal to the mobile communication device RF transceiver 13 to transmit an RF signal containing information to the mobile communication device ID 10, to the impact condition detection 11, along with the communication device GPS velocity, and received GPS 12 location information signals to a monitoring station 18 through wireless communication means, and provides two way voice communication between the mobile communication device user and the monitoring station 18 operator, the monitoring station 18 operator based on received impact condition GPS 12 velocity signal and received GPS 12 location information signals determines the condition and accordingly dispatch's emergency personnel for assistance.

The mobile communication device processor 10 of present invention upon receipt of an impact condition signal from the impact sensor 11 the devise opens automatic or monitoring station 18 controlled two way voice function between the device user and monitoring station operator, used for the operator to provide needed assistance to the mobile communication device user during a bodily impact condition.

Additionally the present invention teaching provides monitoring station 18 received impact condition signals and received GPS co ordinance velocity signal to be viewed by the operator to determine the received impact condition signals are of high velocity impact condition caused by high speed body impact or the received impact condition signal contains no velocity at all, accordingly the operator of the monitoring station determines the received impact condition caused by user involving in a hi speed accident or by user falling down.

The impact sensing mobile communication device of the present invention may contains a camera (not shown on FIG. 1), said mobile communication device upon detection of impact 11 the communication device processor 10 activates the mobile communication device camera and transmits captured video images to a monitoring station 18 to provide audio visual information to the monitoring station 18 operator. The monitoring station 18 may transmit RF signals to the mobile communication device for wirelessly controlling the mobile communication device camera function, and receive desired video images by the monitoring station 18 operator to able provide needed visual assistance.

The invention claimed is:

1. Impact detection mobile communication device comprises:
   a one peace self-contained portable user carry on mobile wireless communication device having a housing containing,
   a processor,
   an impact detection sensor used for detecting user bodily impact condition, said impact sensor is configured to communicate with said processor,
   a GPS receiver used for receiving GPS signals and feed said received GPS location co ordinance velocity signals to said communication device processor, and
   a speaker and a microphone used in conjunction with said processor to provide said user two way voice communication with a monitoring station,
   an RF transceiver configured to communicate with said processor, used for establishing wireless communication between said mobile communication device and said monitoring station, and
   a battery or other power means, used for supplying power to said mobile communication device,
   said user carryon mobile communication device processor in response to received user bodily impact condition signal, transmits through said RF transceiver at least one RF signal containing information to said communication device ID, said communication device impact condition, and said communication device GPS location co ordinance velocity, through a wireless communication network to a monitoring station, said monitoring station according to received communication device ID, impact condition signal, and GPS location velocity signal, opens two way voice link between said mobile communication device user and said monitoring station, and said monitoring station accordingly dispatch, needed assistance to said mobile communication device user location,
   or said communication device processor in response to received impact condition signal, transmits said mobile communication device ID, or transmits said communication device ID and impact condition information, or transmits said mobile communication device ID and said mobile communication device GPS locations co ordinance velocity information to said monitoring station through a wireless communication network, to allow said monitoring station to inquire said communication device processor from its data base to send at least one particular impact condition GPS location co ordinance velocity information of said communication device, or inquire from said communication device processor from its database to send at least one particular impact condition information of said communication device, or both said particular impact condition GPS co ordinance velocity and said particular impact condition information to said monitoring station, and opens two way voice link between said communication device user and said monitoring station operator,
   said monitoring station operator based on received signal(s) dispatch the required rescue personnel to said mobile communication device user location for assistance.

2. Impact detection mobile communication device as claimed in claim 1 wherein said impact detection mobile communication device processor upon detecting said impact condition transmits said communication device ID, impact condition information and GPS location co ordinance velocity signal to a monitoring station, and automatically opens two way voice communication between said communication device user and said monitoring station operator, for said operator to provide needed assistance.

3. Impact detection mobile communication device as claimed in claim 1 wherein said monitoring station received impact condition GPS co ordinance signal may contain hi velocity impact condition or may contain no velocity impact condition signal, accordingly said monitoring station operator determines the received bodily impact condition signals caused by a hi velocity accident, low velocity impact, or no velocity impact, and sends a signal to said mobile communication device to open two way hands free voice communication.

4. Impact detection mobile communication device as claimed in claim 1 wherein said mobile communication device may contains a camera, said mobile communication device upon detection of an impact, said device processor transmits at least one signal containing information to said mobile communication device impact condition and GPS co ordinance velocity to a monitoring station, and activates said mobile communication device camera to transmits captured video images to said monitoring station to provide visual information to said monitoring station operator.

5. Impact detection mobile communication device as claimed in claim 4 wherein said monitoring station upon receipt of said impact condition signal, said monitoring station may transmit RF signals to said mobile communication device processor to wirelessly control said mobile communication device camera functions to provide desired video images to said monitoring station operator for visual assistance.

6. Impact detection mobile communication device comprises:
- a one peace self-contained portable user carry on mobile wireless communication device carried by a person containing an impact detection sensor used for detecting user bodily impact condition and send said detected impact condition signal to a monitoring station, said communication device comprises:
- as processor,
- a GPS receiver used for receiving GPS signals and feed said received GPS co ordinance signals to said communication device processor, and
- a speaker and a microphone used in conjunction with said processor to provide user two way voice communication with a monitoring station,
- an RF transceiver used for establishing wireless communication between said communication device and said monitoring station,
- a battery used for supplying power to said mobile communication device,
- said user carryon mobile communication device processor in response to received user bodily impact condition signal, transmits signal through said communication device transceiver over a wireless communication network at least one identifiable RF signal, containing information to said communication device impact condition, said communication device GPS location co ordinance velocity, and enable two way voice communication between said mobile communication device user and said monitoring station.

\* \* \* \* \*